June 4, 1929.  J. E. FRIES  1,716,039
ROLLING MILL
Filed July 17, 1926
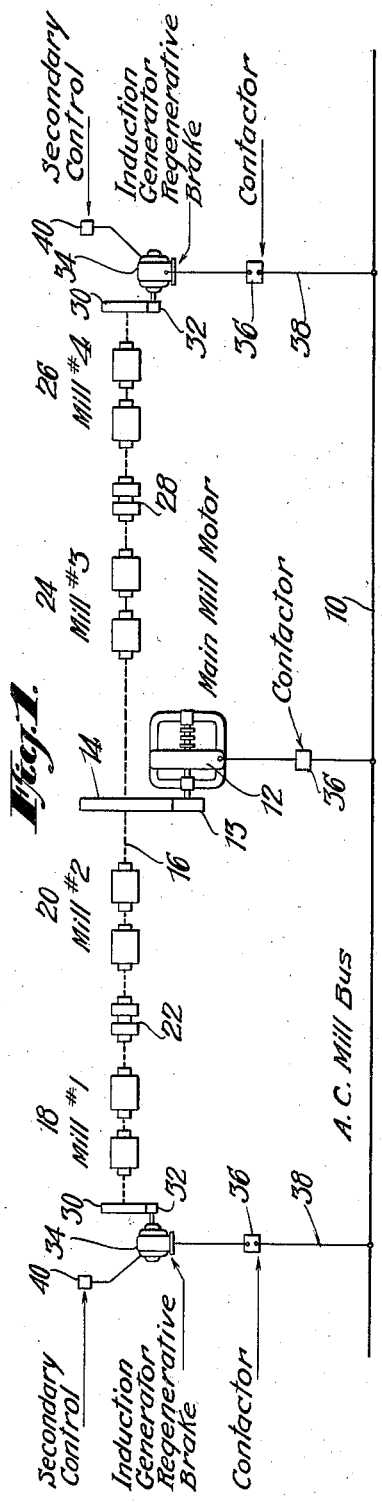
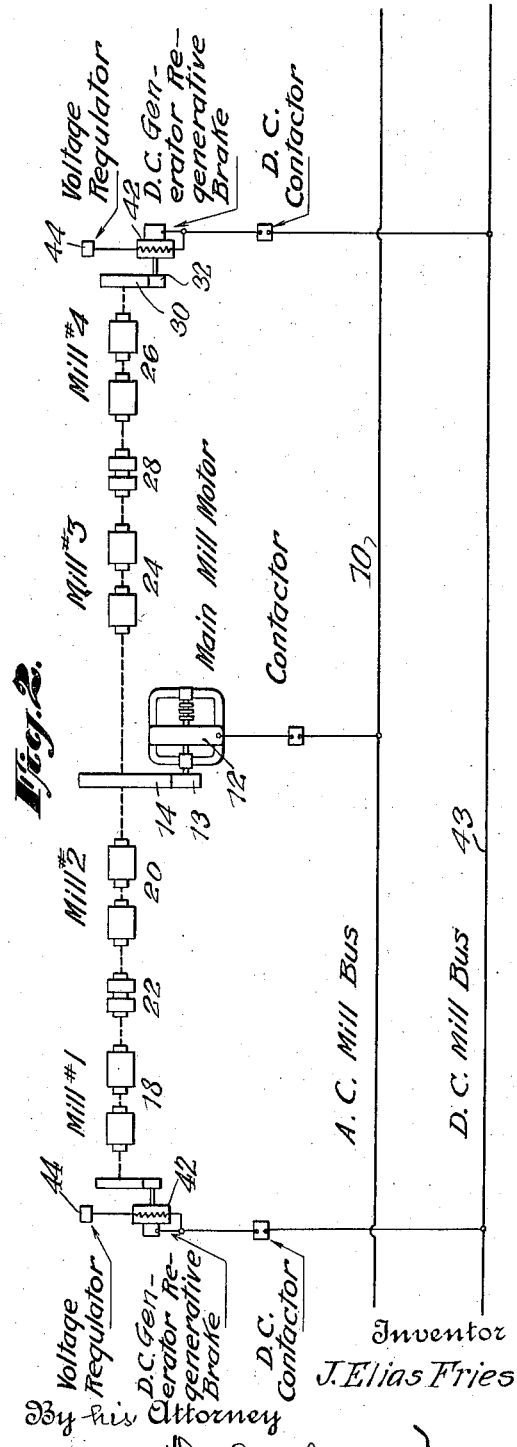
Inventor
J. Elias Fries
By his Attorney Patented June 4, 1929.

1,716,039

UNITED STATES PATENT OFFICE

JOENS ELIAS FRIES, OF BIRMINGHAM, ALABAMA.

ROLLING MILL.

Application filed July 17, 1926. Serial No. 123,233.

This invention relates to improvements in rolling mills and aims to provide an improved method and apparatus whereby the energy expanded to overcome back-lash between the different transmission elements in the mill is regenerated and turned back to the electrical distribution system of the plant in order to save the cost of the power now wasted for that purpose.

The invention will be understood from the following specification when read in connection with the accompanying drawings in which—

Fig. 1 is a diagrammatic view of four interconnected mills of a rolling mill showing the same driven by an A. C. motor and arranged to regenerate the energy or power consumed in overcoming back-lash and feed it back to the A. C. line which drives the motor;

Fig. 2 is a similar diagram illustrating an arrangement in which the regenerated current is fed back into a D. C. distribution system.

Referring first to the arrangement of Fig. 1, 10 represents the A. C. mill bus which supplies current to a motor 12 which is connected through gears 13 and 14 with a shaft 16 arranged to drive the several mills 18 and 20 which are operatively connected by a suitable coupling 22. The shaft 16 also drives mills 24 and 26 which are connected by a suitable coupling 28. A gear 30 is operatively connected with the transmission elements of the mill 18, this gear meshing with pinion 32 carried on the shaft of an induction generator 34 which is connected through the contactor 36 and line 38 with the A. C. mill bus 10. The mill 26 is similarly connected and the gearing and generator are correspondingly numbered at the right side of the drawing.

Heretofore, it has been the common practice in rolling mill operating methods to use a mechanical brake or drag at the end of each rolling train so as to prevent back-lash between the various transmission elements in the mill. Such a mechanical brake naturally consumes considerable power and, hence, adds considerable to the cost of operating the mill. Furthermore, mechanical brakes require water cooling which also adds to the operating costs. My invention does away with this loss because the generator which I provide to prevent back-lash is of such capacity that its rated full load torque corresponds to the torque obtained by the mechanical brake heretofore used. By connecting the generator terminals to the electrical distribution system, the power is turned back into the system, hence, the opposing torque is obtained without substantially any loss of power except an extremely small loss depending upon the efficiency of the generator 34. The load on the generator 34 can be varied by means of a suitable controller and consequently any opposing torque within the limit of the generating capacity can be obtained.

When the speed of the main driving motor 12 varies with load the output of the regenerative generators 34 will vary and consequently the braking effort will also vary. To hold the braking torque practically constant anyone of the well known induction motor load regulators 40 can be well applied to regulate the load on the induction generators; for instance: a solenoid or governor operated water rheostat in the secondary circuit (the solenoid being actuated by the varying current in the primary circuit) or a resistance bank gradually introduced into the secondary circuit by means of contactors operated by relays which again are actuated by the variations in the primary circuit. Or the contactors may be operated from the change of speed of the generator shaft rather than from the change of current in the primary circuit by various means, such as automatic self-contained pumps creating pressures varying with the speed—all of which are well known to the art.

The arrangement in Fig. 2 is quite similar to that above described and the corresponding parts are similarly numbered. Instead of using A. C. generators in this arrangement, I utilize D. C. generators 42 which feed the D. C. bus 43. In the D. C. system, the current output of the generators is kept approximately constant and consequently the braking torque approximately constant by decreasing the field excitation as the speed increases. This again is done by various well known regulators 44 such as the Tirrell regulator or a Brown-Boveri constant current regulator or simply by providing a resistance bank in series with the field winding which is gradually introduced as the speed increases either by contactors in combination with relays, or contactors in combination with automatic pressure pump as mentioned under the A. C. system.

From the foregoing it is clear that the power which is utilized to overcome back-lash or lost motion between the transmission elements of the mill is utilized to regenerate power which was heretofore wasted in rolling mill operations.

Various modifications may be made by those skilled in the art without departing from the invention as claimed.

I claim:

1. The combination with a rolling mill train and its driving means, of an electric generator operatively connected to the mill and arranged to exert a braking action thereon to prevent back-lash and to recover energy usually wasted in braking.

2. The combination with a rolling mill train and a motor for driving said mill of an electric generator arranged to exert a braking action to prevent back-lash between the transmission elements of the mill and to regenerate that part of the energy consumed by said motor usually wasted in braking.

3. The combination with a rolling mill train of an electric generator arranged to exert a braking action to prevent back-lash between the transmission elements.

4. The combination with an electric motor and devices driven thereby of an electric generator arranged to exert a braking action to counteract back-lash in said devices and to continuously regenerate part of the energy consumed by said motor in driving said devices.

In witness whereof, I have hereunto signed my name.

J. ELIAS FRIES.